(12) United States Patent
Mugeraya et al.

(10) Patent No.: US 11,548,612 B2
(45) Date of Patent: Jan. 10, 2023

(54) WINDSHIELD WIPER FLUID DISPENSING SYSTEM

(71) Applicant: Rosemount Aerospace Inc., Burnsville, MN (US)

(72) Inventors: Bhavik Mugeraya, Karnataka (IN); Venkatesh Balakrishnan, Bangalore (IN)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 17/410,217

(22) Filed: Aug. 24, 2021

(65) Prior Publication Data

US 2022/0306270 A1 Sep. 29, 2022

(30) Foreign Application Priority Data

Mar. 26, 2021 (IN) .............................. 202141013512

(51) Int. Cl.
*B60S 1/08* (2006.01)
*B64C 1/14* (2006.01)
(Continued)

(52) U.S. Cl.
CPC ............ *B64C 1/1476* (2013.01); *B05B 1/005* (2013.01); *B05B 1/14* (2013.01); *B05B 7/24* (2013.01); *B05B 9/03* (2013.01); *B05B 12/14* (2013.01); *B05B 13/0405* (2013.01); *B08B 1/005* (2013.01); *B08B 1/008* (2013.01); *B08B 3/024* (2013.01); *B08B 5/02* (2013.01); *B08B 13/00* (2013.01); *B60S 1/487* (2013.01); *B60S 1/522* (2013.01); *F02C 6/06* (2013.01); *B08B 2203/007* (2013.01); *B08B 2203/027* (2013.01); *F05D 2220/323* (2013.01); *F05D 2270/62* (2013.01)

(58) Field of Classification Search
CPC .... B60S 1/52; B60S 1/08; B60S 1/522; B60S 1/487
See application file for complete search history.

(56) References Cited

U.S. PATENT DOCUMENTS 3,231,196 A 1/1966 Keith et al.
3,790,083 A 2/1974 Redifer
(Continued)

FOREIGN PATENT DOCUMENTS

DE 102016213453 A1 3/2017
EP 3581444 A1 12/2019
(Continued)

OTHER PUBLICATIONS

Extended European Search Report for EP Application No. 22164522.9, dated Aug. 2, 2022, p. 8.

*Primary Examiner* — Michael D Jennings
(74) *Attorney, Agent, or Firm* — Kinney & Lange P.A.

(57) ABSTRACT

An aircraft windshield wiper system includes a wiper arm, a wiper blade coupled to a first end of the wiper arm, and an output shaft coupled to a second end of the wiper arm. The wiper blade includes a fluid dispensing system including nozzles, a fluid control unit, fluid lines, fluid source, and a user interface. The wiper blade with the fluid dispensing system is configured to dispense a variety of fluids directly from the wiper blade onto the windshield of an aircraft.

10 Claims, 4 Drawing Sheets

(51) Int. Cl.
*B05B 1/00* (2006.01)
*B05B 1/14* (2006.01)
*B05B 7/24* (2006.01)
*B05B 9/03* (2006.01)
*B05B 12/14* (2006.01)
*B05B 13/04* (2006.01)
*B08B 1/00* (2006.01)
*B08B 3/02* (2006.01)
*B08B 5/02* (2006.01)
*B08B 13/00* (2006.01)
*B60S 1/48* (2006.01)
*B60S 1/52* (2006.01)
*F02C 6/06* (2006.01)

(56) References Cited

U.S. PATENT DOCUMENTS

| | | | |
|---|---|---|---|
| 3,913,167 A | 10/1975 | Frigon | |
| 6,766,553 B2 | 7/2004 | Wilson | |
| 8,621,705 B1 | 1/2014 | Valeanu | |
| 9,260,085 B2 | 2/2016 | Bex et al. | |
| 9,387,831 B2* | 7/2016 | Hartman | B60S 3/044 |
| 2006/0097111 A1 | 5/2006 | Wood et al. | |
| 2016/0090067 A1* | 3/2016 | Kaminaga | B60S 1/0896 |
| | | | 15/250.02 |
| 2018/0170319 A1* | 6/2018 | Schmidt | B60S 1/0818 |
| 2019/0084527 A1 | 3/2019 | Thebault | |
| 2019/0176767 A1* | 6/2019 | Ahn | B60S 1/481 |
| 2020/0033592 A1* | 1/2020 | Crespo | G02B 27/0006 |
| 2020/0150658 A1* | 5/2020 | Ueda | B60S 1/08 |
| 2020/0384956 A1 | 12/2020 | Balasubramanian et al. | |
| 2021/0387595 A1* | 12/2021 | Kim | B60S 1/08 |

FOREIGN PATENT DOCUMENTS

| | | |
|---|---|---|
| FR | 2754508 A1 | 4/1998 |
| WO | 2017085414 A1 | 5/2017 |
| WO | 2019011576 A1 | 1/2019 |

\* cited by examiner

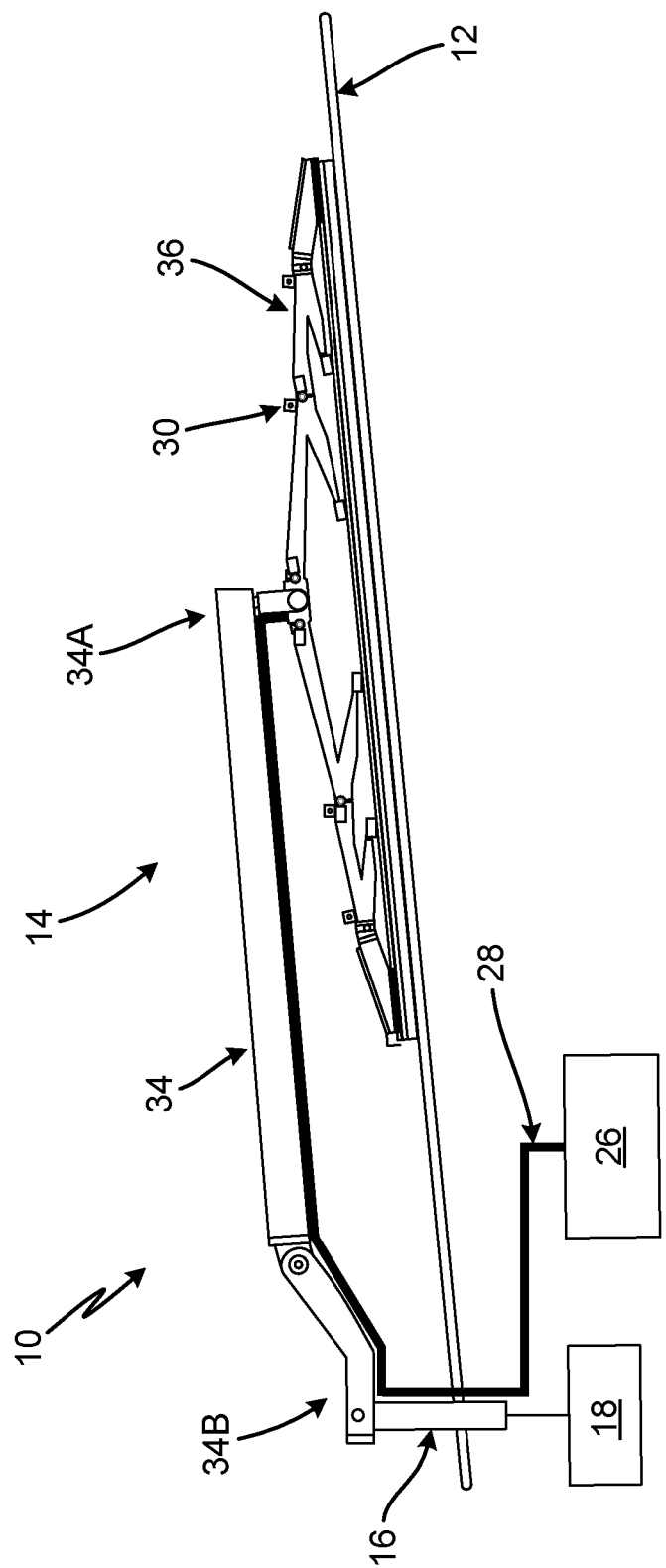

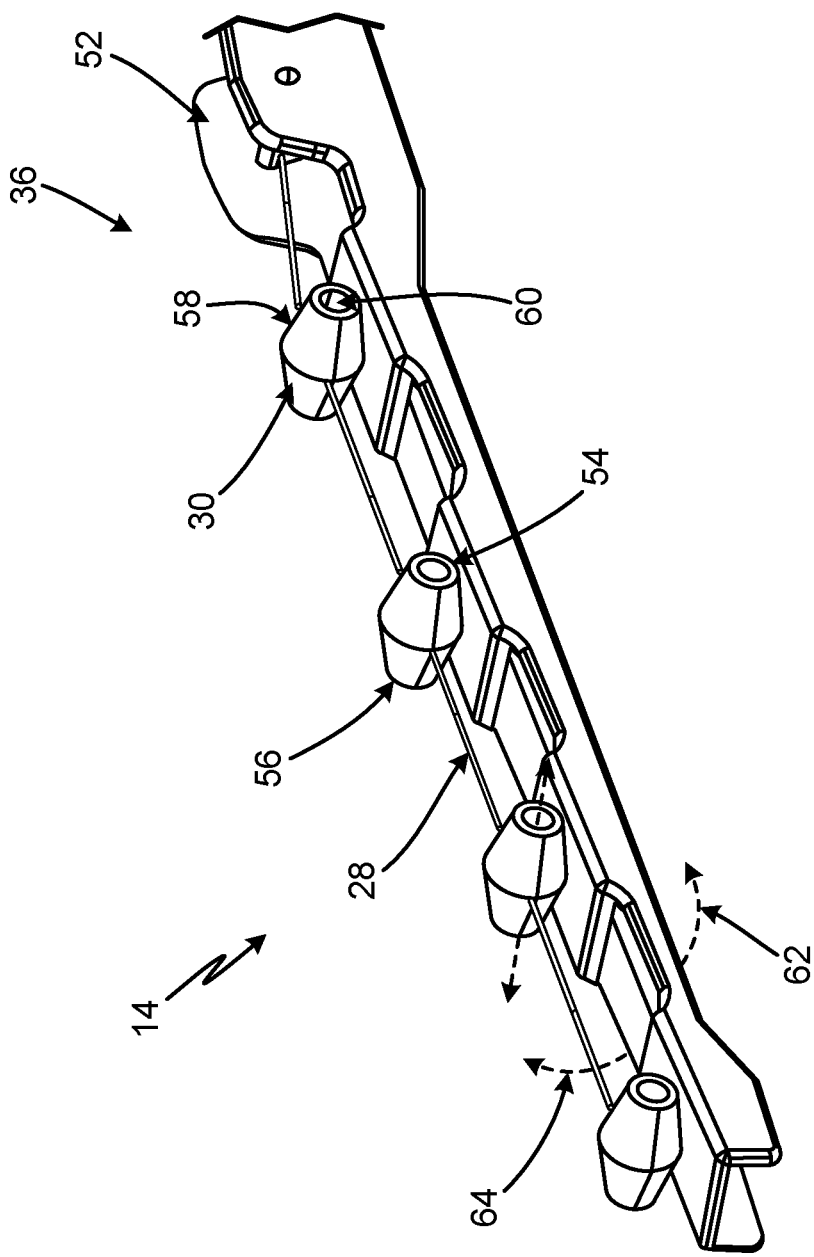

WINDSHIELD WIPER FLUID DISPENSING SYSTEM

CROSS-REFERENCE TO RELATED APPLICATION(S)

This application claims the benefit of Indian Provisional Application No. 202141013512 filed Mar. 26, 2021 for "WINDSHIELD WIPER FLUID DISPENSING SYSTEM" by B. Mugeraya and V. Balakrishnan.

BACKGROUND

The present disclosure relates to windshield wiper systems, and in particular to a windshield wiper system used on an aircraft.

Aircraft windshield wiper systems are used to wipe and clean water or other debris from an aircraft windshield, allowing better visibility out the windshield for both the pilot and co-pilot. Windshield wiper systems include a wiper arm and a wiper blade that sweep back and forth across a windshield, cleaning the windshield for the pilot and co-pilot. Traditionally, windshield wiper systems include fluid nozzles extending through the body of the aircraft and positioned adjacent an edge of the windshield on the aircraft. The fluid nozzles spray a cleaning fluid from the edge of the windshield, reaching only a limited portion of the windshield. As such, current windshield wiper systems including traditional fluid nozzles are limited in their ability to clean water or other debris from the aircraft windshield.

SUMMARY

According to one aspect of the disclosure, a windshield wiper system for use on a windshield of an aircraft is disclosed. The windshield wiper system includes a wiper, a nozzle, an actuator, a controller, a user interface, a fluid control unit, and a fluid source. The wiper includes a wiper arm and a wiper blade coupled to a first end of the wiper arm. The nozzle is coupled to the wiper blade and the nozzle is configured to dispense a fluid. The actuator includes an output shaft coupled to a second end of the wiper arm. The controller is electrically coupled to each of the actuator, user interface, and fluid control unit. The fluid source is fluidly coupled to the nozzle through a fluid line.

According to another aspect of the disclosure, a method of operating a windshield wiper system for use on a windshield of an aircraft is disclosed. The method including the steps of: transferring, by a controller, a command signal to an electrically coupled fluid control unit to activate the fluid control unit; transferring, by the fluid control unit, a fluid from a fluid source through a fluid line to a nozzle coupled to a wiper blade; and dispensing, by the nozzle, the fluid onto the windshield of the aircraft.

BRIEF DESCRIPTION OF THE DRAWINGS

FIG. 1A is a side view of a windshield wiper system on an aircraft windshield.

FIG. 2A is a perspective view of a first embodiment of a wiper blade including integrated nozzles.

DETAILED DESCRIPTION

Figure 1B:
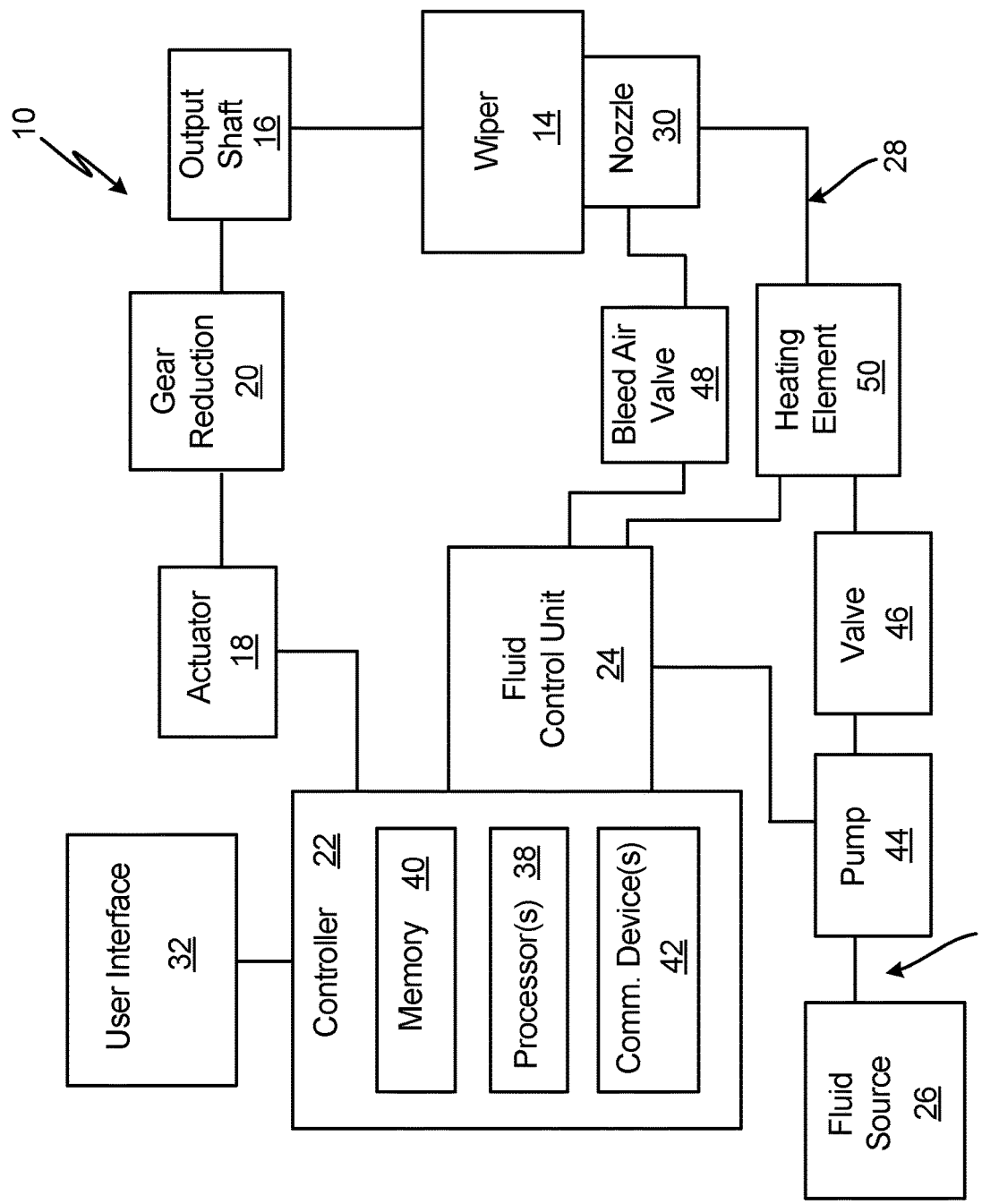
FIG. 1B is a schematic block diagram of the windshield wiper system.

FIG. 1A is a side view of windshield wiper system 10 on windshield 12 of an aircraft (not shown). FIG. 1B is a schematic block diagram of windshield wiper system 10. FIGS. 1A-1B will be discussed together. Further, hereinafter windshield wiper system 10 will be referred to as WWS 10. WWS 10 includes wiper 14, output shaft 16, actuator 18, gear reduction 20, controller 22, fluid control unit 24, fluid source 26, fluid line 28, nozzle 30, and user interface 32. WWS 10 is installed on an aircraft and WWS 10 is configured to clear windshield 12 of rain or other debris.

Wiper 14 includes wiper arm 34 and wiper blade 36. Wiper arm 34 includes first end 34A positioned at a distal end of wiper arm 34 and second end 34B positioned at an opposite distal end of wiper 14 as first end 34A. Wiper blade 36 is coupled to first end 34A of wiper arm 34 through a mechanical connection, such as a threaded or clamping connection. Wiper arm 34 can be constructed from a polymer, a composite, or a metal, among other options. Wiper arm 34 is coupled to output shaft 16 at second end 34B of wiper arm 34 through a mechanical connection, such as a threaded or clamping connection. Output shaft 16 extends through a body portion of the aircraft adjacent windshield 12 but not through windshield 12. Output shaft 16 is configured to rotate about its central axis, providing rotational energy to second end 34B of wiper arm 34, which in turn forces wiper 14 to traverse across windshield 12 in a sweeping motion.

Actuator 18 is coupled to output shaft 16 within the body portion of the aircraft. Actuator 18 is configured to provide rotational energy to output shaft 16, rotating output shaft 16 about its central axis. The rotation of output shaft 16 forces wiper 14 to traverse across windshield 12 in a sweeping motion, therefore actuator 18 provides the energy necessary to drive motion of wiper 14. In the embodiment shown, actuator 18 is a brushless direct current motor. In another embodiment, actuator 18 can be a brushed direct current motor or any other motor configured to provide rotational energy to output shaft 16. Further, actuator 18 is a bi-directional motor that can operate in both directions, allowing output shaft 16, wiper arm 34, and wiper blade 36 to travel across windshield 12 in both directions. Actuator 18 is coupled to output shaft 16 through gear reduction 20, in which gear reduction 20 is positioned between output shaft 16 and actuator 18. In other words, gear reduction 20 is positioned within the body of the aircraft, coupled at one end to output shaft 16, and coupled at the other end to actuator 18. Gear reduction 20 can include a large gear ratio (greater than 3:1), such that many rotations of actuator 18 cause only a few degrees of rotation of wiper 14. Gear reduction 20 is configured to provide precise angular rotation of wiper 14. In the embodiment shown in FIG. 1B, output shaft 16, actuator 18, and gear reduction 20 are shown as separate components. In another embodiment, gear reduction 20 can be integral with actuator 18 such that actuator 18, gear reduction 20, and output shaft 16 are a single assembly.

In the example shown, controller 22 includes processor(s) 38, memory 40, and communication device(s) 42. However, in certain examples, controller 22 can include more or fewer components than components 38, 40, and 42. Processor(s) 38, in one example, are configured to implement functionality and/or process instructions for execution within controller 22. For instance, processor(s) 38 can be capable of processing instructions stored in memory 40. Examples of processor(s) 38 can include any one or more of a microprocessor, a digital signal processor (DSP), an application specific integrated circuit (ASIC), a field-programmable gate array (FPGA), or other equivalent discrete or integrated logic circuitry.

Memory 40 can be configured to store information within controller 22 during operation of WWS 10. Memory 40, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 40 is a temporary memory, meaning that a primary purpose of memory 40 is not long-term storage. Memory 40, in some examples, is described as volatile memory, meaning that memory 40 does not maintain stored contents when power to controller 22 is turned off. Examples of volatile memories can include random access memories (RAM), dynamic random-access memories (DRAM), static random-access memories (SRAM), and other forms of volatile memories. In some examples, memory 40 is used to store program instructions for execution by processor(s) 38. Memory 40, in one example, is used by software or applications running on controller 22 (e.g., a software program implementing a system architecture) to temporarily store information during program execution. Memory 40, in some examples, also includes one or more computer-readable storage media. Memory 40 can be configured to store larger amounts of information than volatile memory. Memory 40 can further be configured for long-term storage of information. In some examples, memory 40 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

Controller 22, in some examples, also includes communication device(s) 42. Controller 22, in one example, utilizes communication device(s) 42 to communicate with external devices via one or more networks, such as one or more wireless or wired networks or both. Communication device(s) 42 can be a network interface card, such as an Ethernet card, an optical transceiver, a radio frequency transceiver, or any other type of device that can send and receive information. Other examples of such network interfaces can include Bluetooth, 3G, 4G, 5G, and Wi-Fi radio computing devices as well as Universal Serial Bus (USB).

Controller 22 is positioned within the body portion of the aircraft and controller 22 is communicatively coupled to actuator 18, fluid control unit 24, and user interface 32. Controller 22 can be communicatively coupled to each component through electrical wires or a wireless connection to send and receive signals from each of actuator 18, fluid control unit 24, and user interface 32. More specifically, controller 22 is communicatively coupled to actuator 18 through a wired or wireless connection and controller 22 is configured to send command signals to actuator 18 to control operation of actuator 18. As such, controller 22 can send electrical signals to and receive electrical signals from actuator 18 to control rotation of output shaft 16 of actuator 18. Controller 22 is also communicatively coupled to fluid control unit 24 through a wired or wireless connection and controller 22 is configured to send command signals to fluid control unit 24 to control operation of fluid control unit 24. As such, controller 22 can send electrical signals to and receive electrical signals from fluid control unit 24 to control dispensing of the fluid through nozzle 30. Further, controller 22 is communicatively coupled to user interface 32 through a wired or wireless connection and controller 22 is configured to receive command signals from user interface 32 indicating an action to be performed by controller 22, discussed further below.

User interface 32 is positioned within the body portion of the aircraft and user interface 32 is communicatively coupled to controller 22 through electrical wires or a wireless connection. User interface 32 can be any device or component that allows the user (pilot or co-pilot) to control operation of WWS 10. User interface 32 can be a graphical user interface (GUI), a knob, a switch, a button, or any other device or component that allows the user to control operation of WWS 10. In one example, a user can interact with user interface 32 to activate WWS 10 to clear rain or debris from windshield 12 of the aircraft. Upon activation by the user, an electrical command signal is sent from user interface 32 to controller 22, and then controller 22 sends a command signal to actuator 18 and/or fluid control unit 24 to activate operation of each respective component. In another example, sensors can be positioned on or adjacent windshield 12 and the sensors can automatically activate WWS 10 without user interaction with user interface 32. User interface 32 allows a pilot and/or co-pilot to activate WWS 10, deactivate WWS 10, control the sweeping speed of wiper 14 on windshield 12, control the flow rate of the fluid dispensing from nozzle 30, control the temperature of the fluid dispensing from nozzle 30, and allows the user to choose the type of fluid dispensing from nozzle 30 onto windshield 12 of the aircraft, discussed further below.

Fluid control unit 24 is positioned within the body portion of the aircraft and fluid control unit 24 is communicatively coupled to controller 22 through electrical wires or a wireless connection. Fluid control unit 24 includes pump 44, valve 46, bleed air valve 48, and heating element 50. Fluid control unit 24 includes computer coded instructions that are utilized by controller 22 to activate dispensing of a fluid upon user interaction with user interface 32. Fluid control unit 24 is communicatively coupled to controller 22, pump 44, valve 46, bleed air valve 48, and heating element 50. As discussed, controller 22 can send electrical signals to and receive electrical signals from fluid control unit 24 to control dispensing of the fluid. After receiving a command signal from controller 22, fluid control unit 24 sends electrical signals to and receives electrical signals from each of the electrically/communicatively coupled pump 44, valve 46, bleed air valve 48, and heating element 50 to control operation of each respective component.

Pump 44 is a component of fluid control unit 24 that is positioned within the aircraft and pump 44 is configured to force fluid to flow/travel from fluid source 26 through fluid lines 28 until the fluid reaches nozzle 30. Pump 44 can be any device that is capable of forcing the fluid to flow/travel through fluid lines 28 as described. Pump 44 can be positioned between fluid source 26 and nozzle 30 and can be coupled to fluid line 28. Fluid line 28 can be a conduit, tube, pipe, hose, or the like that includes a hollow interior portion allowing fluids to remain contained and flow within the interior of fluid lines 28. Fluid lines 28 can be constructed from a metal, a polymer, or a composite material, among other options. Fluid lines 28 are configured to provide a flow path from fluid source 26 to nozzle 30, allowing fluid source 26 and nozzle 30 to be fluidly coupled. In some examples, fluid source 26 can be an impermeable vessel of any shape, size, and material that is configured to store the fluid that will be dispensed through nozzle 30. In other words, fluid source 26 can be a leak proof container that includes a hollow interior configured to store fluids before the fluids are used by WWS 10. In other examples, fluid source 26 can be a flow path from a portion of an engine, compressor, auxiliary power unit, or any other hot air source within the aircraft, such as for example to provide engine bleed air to nozzle 30.

Fluid source 26 is positioned within the aircraft body, remote from nozzle 30, and fluidly coupled to nozzle 30 through fluid lines 28.

An aircraft can include a plurality of fluid sources 26, with each one of the plurality of fluid sources 26 storing a different fluid. For example, one of the plurality of fluid sources 26 can be a water reservoir configured to store water; one of the plurality of fluid sources 26 can be a windshield cleaning fluid reservoir configured to store windshield cleaning fluid; and one of the plurality of fluid sources 26 can be a chemical rain repellant reservoir configured to store chemical rain repellant. Additionally, one of the plurality of fluid sources 26 can be a high temperature air source from a portion of the engine of the aircraft configured to provide bleed air to nozzle 30. An aircraft can include any number of fluid sources 26 and any desired fluid can be stored in the fluid sources 26 to aid in cleaning windshield 12 of the aircraft. Each of the plurality of fluid sources 26 is coupled to a fluid line 28, which extends from fluid source 26 to nozzle 30. In one example, pump 44 is configured to force water to flow from a water reservoir (fluid source 26) through fluid line 28 and to nozzle 30. In another example, pump 44 is configured to force windshield cleaning fluid to flow from a windshield cleaning fluid reservoir (fluid source 26) through fluid line 28 and to nozzle 30. In another example, pump 44 is configured to force chemical rain repellant to flow from a chemical rain repellant reservoir (fluid source 26) through fluid line 28 and to nozzle 30. In yet another embodiment, bleed air valve 48 can be opened to allow bleed air to flow from a high temperature air source within the engine of the aircraft through fluid line 28 and to nozzle 30, discussed further below. As such, a flow path exists between each of the plurality of fluid sources 26 and nozzle 30, allowing each fluid to be transferred to nozzle 30 and dispensed onto windshield 12 of the aircraft.

As discussed, fluid lines 28 can be a conduit, tube, pipe, hose, or the like that includes a hollow interior portion allowing fluids to remain contained and flow within the interior of fluid lines 28. Fluid lines 28 can be constructed from a metal, a polymer, or a composite material, among other options. Fluid lines 28 are configured to provide a flow path from fluid sources 26 to nozzle 30, allowing fluid sources 26 and nozzle 30 to be fluidly coupled. In the embodiment shown, fluid lines 28 are coupled to each of fluid sources 26, routed through the body portion of the aircraft, routed out the body portion of the aircraft adjacent output shaft 16 of actuator 18, routed through a hollow interior of wiper arm 34 to wiper blade 36, and then coupled to input port 58 of nozzle 30. In another embodiment, fluid lines 28 can be routed from fluid sources 26 to input port 58 following a different route or path. For example, fluid line 28 does not need to be positioned adjacent output shaft 16 and fluid line 28 could be coupled to an exterior of wiper arm 34.

With that said, routing fluid lines 28 out the body portion of the aircraft adjacent output shaft 16 provides the benefit of eliminating another aperture extending through the body of the aircraft because fluid line 28 can be routed through the same aperture that output shaft 16 extends through. Routing fluid lines 28 through a hollow interior of wiper arm 34 provides the benefit of increasing the aerodynamic performance of wiper arm 34 because fluid line 28 is concealed and does not induce extra drag on wiper arm 34. In one embodiment, wiper arm 34 can have a generally C-shaped cross-section and fluid line 28 can be attached to the hollow interior portion of wiper arm 34 through fasteners such as clips, clamps, or screws, among other options. In another embodiment, wiper arm 34 can have any geometrical shaped cross-section with a hollow interior portion allowing fluid line 28 to remain concealed and coupled within the interior portion of wiper arm 34. In a preferred embodiment, wiper arm 34 includes a geometrical shape that minimizes wind resistance to increase aerodynamic efficiency of the aircraft. For example, wiper arm 34 can include smooth and/or rounded edges to reduce the drag forces on wiper arm 34, improving the overall aerodynamic efficiency of wiper arm 34. Wiper arm 34 is coupled to output shaft 16 and wiper blade 36, facilitating the sweeping of wiper blade 36 on windshield 12. Further, wiper arm 34 includes a hollow interior portion for containing and coupling fluid line 28, allowing fluid line 28 to be routed and coupled to input port 58 of nozzle 30 while also minimizing drag forces on wiper arm 34.

Valve 46 is a component of fluid control unit 24 that is positioned within the aircraft and valve 46 is configured to control the flow rate of fluids travelling from fluid sources 26 to nozzle 30. More specifically, valve 46 is configured to control the flow rate of fluids travelling from fluid sources 26 such as the water reservoir, windshield cleaning fluid reservoir, and the chemical rain repellant reservoir. In one embodiment, valve 46 can be integral with pump 44 such that valve 46 and pump 44 are a single assembly. In another embodiment, valve 46 can be a separate component from pump 44. Valve 46 is positioned between fluid source 26 and nozzle 30. Valve 46 is coupled to fluid line 28 to control and adjust the flow rate of fluids flowing through fluid line 28. Further, valve 46 is electrically coupled to fluid control unit 24, such that fluid control unit 24 controls operation of valve 46 by sending command signals to open and/or close valve 46. Likewise, bleed air valve 48 is a component of fluid control unit 24 that is positioned within the aircraft and bleed air valve 48 is configured to control the flow rate of high temperature bleed air travelling from the engine of the aircraft through fluid line 28 to nozzle 30. Bleed air valve 48 is electrically coupled to fluid control unit 24, such that fluid control unit 24 controls operation of bleed air valve 48 by sending command signals to open and/or close bleed air valve 48.

Heating element 50 is a component of fluid control unit 24 that is positioned within the aircraft and positioned between pump 44 and nozzle 30. Heating element 50 is coupled to fluid line 28 and heating element 50 is configured to increase the temperature of the fluid travelling through fluid line 28 before the fluid reaches nozzle 30. More specifically, heating element 50 is configured to increase the temperature of fluids travelling from fluid sources 26 such as the water reservoir, windshield cleaning fluid reservoir, and the chemical rain repellant reservoir. In one embodiment, heating element 50 is a component that converts electrical energy into heat through a resistance heating element, which increases in temperature as an electric current flows through the resistance heating element. In another embodiment, heating element 50 can be a component that receives high temperature bleed air from the engine of the aircraft and then flows the high temperature air around fluid line 28 to increase the temperature of the fluid flowing through fluid line 28. Heating element 50 is electrically coupled to fluid control unit 24, such that fluid control unit 24 controls operation of heating element 50 by sending command signals to increase or decrease the temperature of heating element 50. Heating element 50 can increase the temperature of the fluid flowing through fluid line 28 to aid in the cleaning of windshield 12 of the aircraft. Increasing the temperature of the fluid dispensing from nozzle 30 onto windshield 12 can melt frozen water or other frozen debris on windshield 12, providing better visibility for both the pilot and co-pilot. In the embodiment described, heating element 50 is included to increase the temperature of fluids flowing through fluid line 28. In another embodiment, fluid control unit 24 can include a cooling element, such as a heat exchanger, to remove heat from the fluid flowing through fluid lines 28 to decrease the temperature of the fluid. In some examples, the cooling element can replace heating element 50 within fluid control unit 24. In other examples, the cooling element can be an addition to fluid control unit 24, such that fluid control unit 24 includes both heating element 50 and the cooling element to either heat or cool the fluid, respectively.

Figure 2B:
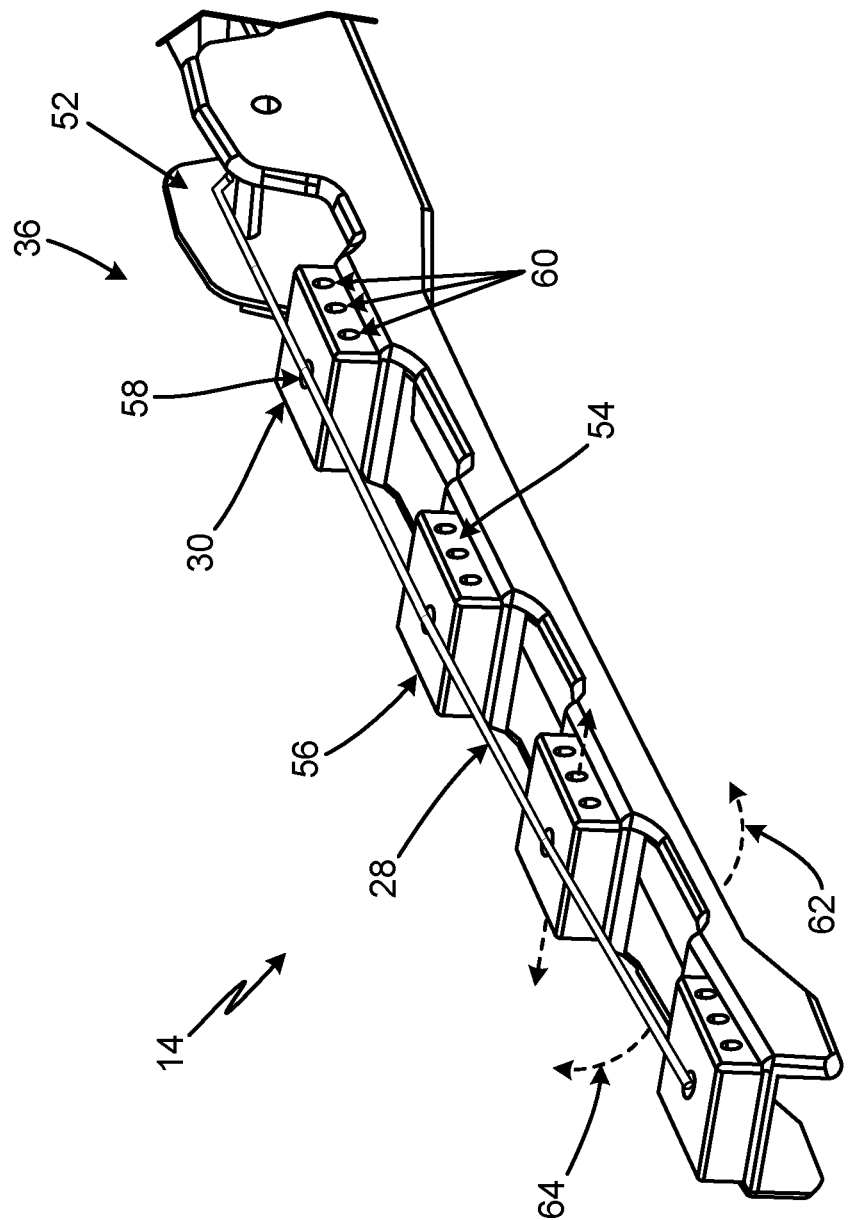
FIG. 2B is a perspective view of a second embodiment of a wiper blade including integrated nozzles.

FIG. 2A is a perspective view of a first embodiment of wiper blade 36 including nozzles 30. FIG. 2B is a perspective view of a second embodiment of wiper blade 36 including nozzles 30. FIGS. 2A-2B will be discussed together. Further, FIGS. 2A-2B do not show the rubber element of wiper blade 36 that engages windshield 12, for clarity purposes. As discussed, WWS 10 includes wiper 14 including wiper blade 36, fluid line 28, and nozzle 30 coupled to wiper blade 36. Wiper blade 36 includes wiper support 52 configured to provide structural support to wiper blade 36 and rubber element (not shown) configured to engage and clean windshield 12.

Nozzle 30 is coupled to wiper support 52 of wiper blade 36 and nozzle 30 is configured to dispense a fluid onto windshield 12 of the aircraft. Nozzle 30 can be constructed from a polymer, a composite, or a metal, among other options. In the embodiment shown, nozzle 30 is coupled to a top surface of wiper support 52 of wiper blade 36. In another embodiment, nozzle 30 can be coupled to a front surface, a rear surface, or a side surface of wiper support 52 of wiper blade 36. Nozzle 30 is coupled to wiper support 52 through fasteners such as clips, clamps, or screws, among other options. In the embodiment shown, nozzles 30 are removable from wiper support 52 of wiper blade 36 by removing the fastener (clips, clamps, or screws) securing nozzle 30 to wiper support 52. In another embodiment, nozzles 30 can be formed integral with wiper support 52 and wiper blade 36, such that nozzles 30 and wiper blade 36 are machined and/or formed from a single-piece construction. Removable nozzles 30 provide the benefit of allowing the nozzles 30 to be removed from wiper blade 36 and installed on a new wiper blade 36 during maintenance or replacement of wiper blade 36, due to degradation and wear over time. As such, removable nozzles 30 reduce the cost of WWS 10 because nozzles 30 can be reused on new or replacement wiper blades 36 and nozzles 30 do not need to be purchased for each new or replacement wiper blade 36.

In the embodiments shown in FIGS. 2A-2B, each half of wiper blade 36 includes four nozzles 30, or eight total nozzles 30 per wiper blade 36. In another embodiment, wiper blade 36 can include more than or less than eight nozzles per wiper blade 36. Further, in the embodiment shown, each one of the plurality of nozzles 30 is spaced equidistance from an adjacent nozzle 30 along a length of wiper blade 36. In another embodiment, nozzles 30 can be spaced any distance from an adjacent nozzle 30 such that each nozzle 30 does not need to be spaced equidistance from an adjacent nozzle 30 along a length of wiper blade 36. The number of nozzles 30 per wiper blade 36 and the spacing of nozzles 30 along a length of wiper blade 36 depends on a variety of factors, such as the size of the aircraft, the length of wiper blade 36, and the size of windshield 12, among other factors.

Nozzle 30 includes first side 54, second side 56, input port 58, and at least one output port 60. First side 54 is a surface of nozzle 30 that can be parallel with a portion of wiper support 52 and first side 54 faces or points in first sweeping direction 62 of wiper blade 36. Second side 56 is a surface of nozzle 30 that can be parallel with a portion of wiper support 52 and second side 56 faces or points in second sweeping direction 64 of wiper blade 36. First side 54 and second side 56 can be parallel with each other and face in opposite directions. In other words, first side 54 faces in a first direction and second side 56 face in a second direction that is approximately 180 degrees from the first direction. In the embodiment shown, first side 54 and second side 56 are described as being parallel with each other as well as parallel with a portion of wiper support 52. In another embodiment, first side 54 and second side 56 may not be parallel with each other and also may not be parallel with a portion of wiper support 52. Further, in the embodiment shown, first side 54 and second side 56 are shown and described as facing in opposite directions approximately 180 degrees apart. In another embodiment, first side 54 and second side 56 can face in directions that are more or less than 180 degrees apart.

Each nozzle 30 coupled to wiper support 52 of wiper blade 36 includes input port 58. In the embodiment shown in FIG. 2A, input port 58 of each nozzle 30 is positioned on a side surface of each nozzle 30, other than first side 54 and second side 56 of nozzle 30. In the embodiment shown in FIG. 2B, input port 58 of each nozzle 30 is positioned on a top surface of each nozzle 30. In yet another embodiment, input port 58 can be positioned on any desired surface of nozzle 30. Input port 58 is fluidly coupled to fluid line 28 and input port 58 is configured to receive fluid from fluid line 28 to be dispensed by nozzle 30. Input port 58 can be any suitable fluid port that fluidly seals the connection between fluid line 28 and input port 58, preventing leakage between the components. Further, input port 58 can be constructed from a metallic, polymeric, or composite material. In the embodiment shown, a single fluid line 28 fluidly couples each nozzle 30 in series, such that fluid must flow through each nozzle 30 along a length of wiper support 52 before reaching an end nozzle 30 positioned at an end of wiper support 52. In another embodiment, a plurality of fluid lines 28 can extend along wiper support 52, with each fluid line 28 fluidly coupled to a single input port 58 (or a multitude of ports) of a single nozzle 30. The fluid lines can be connected to the different nozzles in series or parallel or any combination of both. This configuration allows the fluid to be delivered to certain individual nozzles 30 on the wiper blade 36 in order to be applied at certain areas of the windshield 12. This also prevents the intermixing of different fluids in the fluid line 28 and allows certain individual nozzles 30 and its corresponding fluid line 28 to be designed as per the type of fluid dispersed by them.

Each nozzle 30 coupled to wiper support 52 of wiper blade 36 includes at least one output port 60 on each of first side 54 and second side 56 of nozzle 30. In the embodiment shown in FIG. 2A, each nozzle 30 includes one output port 60 positioned on first side 54 and one output port 60 positioned on second side 56. In the embodiment shown in FIG. 2B, each nozzle 30 includes three output ports 60 positioned on first side 54 and three output ports 60 positioned on second side 56. In yet another embodiment, each nozzle 30 can include more than or less than three output ports 60 positioned on each of first side 54 and second side 56 of nozzle 30. Output ports 60 positioned on both first side 54 and second side 56 allow nozzle 30 to dispense fluid received through input ports 58 from both sides of nozzle 30, in opposite directions. More specifically, output ports 60 positioned on first side 54 and second side 56 allows nozzle 30 to dispense fluid simultaneously in first sweeping direction 62 and second sweeping direction 64, resulting in a more efficient a thorough cleaning of windshield 12. Output port 60 is fluidly coupled to an interior of nozzle 30 and output port 60 is configured to dispense fluid received through input port 58 onto windshield 12. Output port 60 can be constructed from a metallic, polymeric, or composite material. In the embodiments shown in FIGS. 2A-2B, the fluid dispensing from output port 60 of nozzle 30 is configured to dispense perpendicular to first side 54 and second side 56. In another embodiment, the fluid dispensing from output port 60 can dispense at an angle other than perpendicular to first side 54 and second side 56.

Further, in the embodiment shown, nozzles 30 are described as dispensing fluid from two sides of nozzle 30. In another embodiment, nozzles 30 can include valves within each nozzle 30 that can prevent fluid from dispensing from first side 54, second side 56, or both sides. The valves can be connected to controller 22 and a user can interact with user interface 32 to cause the valves to open or close as desired. In yet another embodiment, each nozzle 30 can include two fluid lines 28 fluidly coupled to two separate input ports 58 of each nozzle 30. Each input port 58 can be configured to transfer fluid to either first side 54 or second side 56. As such, a user can stop flow to one of the fluid lines, allowing fluid to flow from output port 60 on either first side 54 or second side 56. Preventing flow from one side of nozzle 30 increases efficiency of WWS 10 because when reaching the sweep limits some fluid may be dispensed off the windshield onto the aircraft body, which results in waste of fluid and more cost for the airline.

In the embodiment shown, nozzles 30 are described as being stationary with respect to wiper support 52. In another embodiment, nozzles 30 can be coupled to wiper support 52 through hinges, such that nozzles 30 can rotate to change the angle of the spray from nozzles 30. Each of the hinges can be connected together through a linkage or each hinge can be individual and not associated with the other hinges. In an example in which a linkage connects each hinge together, an actuating mechanism can be connected to the hinges and to controller 22, allowing the user to interact with user interface 32 to change the angle of the hinges and nozzles 30 through commands from controller 22. Further, in an example in which controller 22 is communicatively coupled to the actuating mechanism and/or hinges, the hinges can automatically change their angle as wiper 14 sweeps across the windshield of the aircraft. In an example in which each nozzle is individual, the hinges and nozzles 30 can be manually adjusted to change the angle of each nozzle 30 along wiper support 52. The angle of the hinges and nozzles 30 can be changed while wiper 14 is stationary as well as while wiper 14 sweeps across the windshield of the aircraft. Changing the angle of nozzles 30 provides the benefit of increasing efficiency of WWS 10 by allowing each nozzle to target specific areas of the windshield of the aircraft to ensure proper coverage of fluid dispensing from each nozzle 30.

In operation, a user (pilot or co-pilot) can interact with user interface 32 to activate WWS 10, deactivate WWS 10, control the sweeping speed of wiper 14, choose the type of fluid (bleed air, water, windshield cleaning fluid, or chemical rain repellant) dispensing from nozzle 30, control the flow rate of the fluid dispensing from nozzle 30, and control the temperature of the fluid dispensing from nozzle 30. Upon user interaction with user interface 32, a command signal is transferred from user interface 32 to the electrically coupled controller 22 indicating an action to be performed by controller 22. Controller 22 stores the received command signal within memory 40 and processes the command signal using processor(s) 38. Once processed, controller 22 sends a command signal to actuator 18 and/or fluid control unit 24. A command signal sent to actuator 18 initiates or stops rotation of output shaft 16, causing wiper 14 to sweep or stop sweeping across windshield 12, respectively. Additionally, a command signal can be sent to actuator 18 to adjust the rotational speed of output shaft 16 to adjust the sweeping speed of wiper 14 on windshield 12. A command signal sent to fluid control unit 24 can activate or deactivate fluid control unit 24, discussed below.

Activation of fluid control unit 24 can include, but is not limited to, choosing the type of fluid dispensing from nozzle 30, controlling the flow rate of the fluid dispensing from nozzle 30, and controlling the temperature of the fluid dispensing from nozzle 30. As discussed, the user can choose the type of fluid (bleed air, water, windshield cleaning fluid, or chemical rain repellant) desired to dispense from nozzle 30 by interacting with user interface 32. Upon choosing the desired fluid, fluid control unit 24 sends a command signal to begin transferring the fluid from the correct fluid source 26. If bleed air is chosen as the fluid, fluid control unit 24 sends a command signal to bleed air valve 48 to open bleed air valve 48 to allow the bleed air from the engine to flow through fluid lines 28 to nozzle 30. If water, windshield cleaning fluid, or chemical rain repellant are chosen as the fluid, fluid control unit 24 sends a command signal to pump 44 to begin pumping the appropriate fluid from the correct fluid source 26 (water reservoir, windshield cleaning fluid reservoir, or chemical rain repellant reservoir). Simultaneously, fluid control unit 24 sends a command signal to valve 46 indicating that valve 46 should open to allow the fluid to flow through fluid lines 28 to nozzle 30. If the user adjusts the flow rate of the fluid through user interface 32, fluid control unit 24 sends a command signal to valve 46 to either open or close valve 46 more or less, respectively, to adjust the flow rate of the fluid flowing through fluid lines 28. Additionally, if the user adjusts the temperature of the fluid through user interface 32, fluid control unit 24 sends a command signal to heating element 50 to either increase or decrease the temperature of heating element 50 to adjust the temperature of the fluid flowing through fluid lines 28 to achieve the desired fluid temperature.

As such, a user can interact with user interface 32 within the cockpit of the aircraft to control many different operations of WWS 10. In contrast, traditional windshield wiper systems only allow a pilot or co-pilot the options of turning on or turning off the windshield wiper system and adjusting the speed of the wiper blades. Traditional windshield wiper systems do not include the capabilities to choose the fluid type, flow rate, fluid temperature, as well as the sweeping speed of the wipers, as is achieved by WWS 10. Further, traditional windshield wiper systems include fluid nozzles positioned at the edge of the windshield of the aircraft, restricting the fluid nozzles to dispensing fluid on only a limited area of the windshield. In contrast, WWS 10 includes nozzles 30 coupled to wiper blade 36, such that nozzles 30 sweep across windshield 12 with wiper blade 36. This allows nozzles 30 to dispense fluid onto a greater area of windshield 12 as wiper blade 36 sweeps across windshield 12. Further, the traditional nozzles used on windshield wiper systems extend through apertures within the body of the aircraft, resulting in additional manufacturing operations and higher cost for the airline manufacturers. In contrast, WWS 10 routes fluid lines 28 through the aperture that output shaft 16 extends through, eliminating an extra aperture through the body of the aircraft, which ultimately reduces the cost of the aircraft and WWS 10.

In addition, nozzles 30 of WWS 10 dispense fluid from first side 54 and second side 56 of nozzle 30 while sweeping in both first sweeping direction 62 and second sweeping direction 64. Dispensing fluid from both sides of nozzle 30 ensures efficient cleaning of windshield 12 by using less cleaning fluid than traditional windshield wiper systems because the sweeping nozzles 30 target specific areas on windshield 12 to be cleaned instead of spraying over the entire windshield. Further, nozzles 30 sweeping across windshield 12 along with dispensing fluid from both sides of nozzles 30 allows fluid to reach a greater area of windshield 12, which results in a greater area of windshield 12 being cleaned. Ultimately, this leads to a safer WWS 10 as compared to traditional windshield wiper systems because the pilot and co-pilot have increased view out windshield 12 of the aircraft.

Further, WWS 10 allows a user to activate fluid control unit 24 without activating actuator 18. This provides the benefit of allowing the user to dispense a fluid on windshield 12 without sweeping wiper arm 34 across windshield 12. This is advantageous over traditional wiper systems because the user can clear windshield 12 without obstructing the users view with a sweeping wiper arm 34. For example, a user can activate fluid control unit 24 to dispense bleed air onto windshield 12 to blow dust/sand from windshield 12 or dispense bleed air onto windshield 12 to melt snow/ice present on windshield 12. In either circumstance, sweeping wiper arm 34 across windshield 12 may not be necessary to achieve the desired cleaning effect on windshield 12. Further, clearing windshield 12 without activating actuator 18 results in power savings for WWS 10 and the overall aircraft. As described, WWS 10 provides many benefits over tradition windshield wiper systems that will be appreciated by those skilled in the art. Further, additional benefits not specifically described will be realized by those skilled in the art.

Discussion of Possible Embodiments

The following are non-exclusive descriptions of possible embodiments of the present invention.

A windshield wiper system for use on a windshield of an aircraft, the windshield wiper system comprising: a wiper comprising a wiper arm and a wiper blade coupled to a first end of the wiper arm; a nozzle coupled to the wiper blade, wherein the nozzle is configured to dispense a fluid; an actuator comprising an output shaft, wherein the output shaft is coupled to a second end of the wiper arm; a controller electrically coupled to each of the actuator, a user interface, and a fluid control unit; and a fluid source fluidly coupled to the nozzle through a fluid line.

The windshield wiper system of the preceding paragraph can optionally include, additionally and/or alternatively, any one or more of the following features, configurations and/or additional components:

The actuator is configured to rotate the output shaft to sweep the wiper arm and wiper blade across the windshield of the aircraft.

The controller is configured to: send electrical signals to and receive electrical signals from the actuator to control rotation of the output shaft of the actuator; send electrical signals to and receive electrical signals from the fluid control unit to control operation of the fluid control unit; and receive electrical signals from the user interface indicating an action to be performed by the controller.

The nozzle is removable from the wiper blade.

The fluid dispensing from the nozzle is bleed air, water, windshield cleaning fluid, or chemical rain repellant.

The bleed air is directed from a gas turbine engine of the aircraft to the nozzle; the water is directed from a water reservoir to the nozzle; the windshield cleaning fluid is directed from a windshield cleaning fluid reservoir to the nozzle; or the chemical rain repellant is directed from a chemical rain repellant reservoir to the nozzle.

The fluid control unit includes: a pump configured to force the fluid to travel from the water reservoir, windshield cleaning fluid reservoir, or the chemical rain repellant reservoir through the fluid line to the nozzle; a bleed air valve configured to allow or prevent bleed air from flowing through the fluid line to the nozzle; a valve configured to control the flow rate of the fluid travelling from the fluid source and through the fluid line; and a heating element configured to increase the temperature of the fluid travelling through the fluid line before the fluid reaches the nozzle.

The fluid line is routed adjacent the output shaft of the actuator, through a hollow interior of the wiper arm, and to an input port of the nozzle.

The nozzle includes two sides and at least one output port on each of the two sides, and wherein the nozzle is configured to dispense fluid from the at least one output port on each of the two sides of the nozzle.

Each wiper blade includes a plurality of nozzles coupled to the wiper blade, and wherein each one of the plurality of nozzles is spaced equidistance apart along a length of the wiper blade.

A method of operating a windshield wiper system for use on a windshield of an aircraft, the method comprising: transferring, by a controller, a command signal to an electrically coupled fluid control unit to activate the fluid control unit; transferring, by the fluid control unit, a fluid from a fluid source through a fluid line to a nozzle coupled to a wiper blade; and dispensing, by the nozzle, the fluid onto the windshield of the aircraft.

The method of the preceding paragraph can optionally include, additionally and/or alternatively, any one or more of the following features, configurations and/or additional components:

The wiper blade is coupled to a first end of a wiper arm and an actuator comprising an output shaft is coupled to a second end of the wiper arm, and wherein the actuator is configured to rotate the output shaft to sweep the wiper arm and the wiper blade across the windshield of the aircraft.

The controller is electrically coupled to the actuator, and wherein the controller is configured to send electrical signals to and receive electrical signals from the actuator to control rotation of the output shaft of the actuator.

The fluid line is routed adjacent the output shaft of the actuator, through a hollow interior of the wiper arm, and to an input port of the nozzle.

Receiving, by a user interface, input from a pilot or co-pilot; transferring, by the user interface, a command signal to the electrically coupled controller indicating an action to be performed by the controller; and transferring, by the controller, a command signal to the electrically coupled fluid control unit to activate the fluid control unit.

The fluid dispensing from the nozzle is bleed air, water, windshield cleaning fluid, or chemical rain repellant.

The bleed air is directed from a gas turbine engine of the aircraft to the nozzle; the water is directed from a water reservoir to the nozzle; the windshield cleaning fluid is directed from a windshield cleaning fluid reservoir to the nozzle; or the chemical rain repellant is directed from a chemical rain repellant reservoir to the nozzle.

The step of transferring by the fluid control unit further comprises: pumping, by a pump, the fluid from the water reservoir, the windshield cleaning fluid reservoir, or the chemical rain repellant reservoir through the fluid line to the nozzle; valving, by a bleed air valve, the bleed air to allow or prevent bleed air from flowing through the fluid line to the nozzle; valving, by a valve, the fluid travelling through the fluid line to control a flow rate of the fluid in the fluid line; and heating, by a heating element, the fluid travelling through the fluid line to increase the temperature of the fluid before the fluid reaches the nozzle.

The nozzle is removable from the wiper blade; the nozzle includes two sides and at least one output port on each of the two sides; and the nozzle is configured to dispense fluid from the at least one output port on each of the two sides of the nozzle.

Each wiper blade includes a plurality of nozzles coupled to the wiper blade, and wherein each one of the plurality of nozzles is spaced equidistance apart along a length of the wiper blade.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A windshield wiper system for use on a windshield of an aircraft, the windshield wiper system comprising:
   a wiper comprising a wiper arm and a wiper blade coupled to a first end of the wiper arm;
   a nozzle coupled to the wiper blade, wherein the nozzle is configured to dispense a fluid;
   an actuator comprising an output shaft, wherein the output shaft is coupled to a second end of the wiper arm;
   a controller electrically coupled to each of the actuator, a user interface, and a fluid control unit; and
   a fluid source fluidly coupled to the nozzle through a fluid line.

2. The windshield wiper system of claim 1, wherein the actuator is configured to rotate the output shaft to sweep the wiper arm and wiper blade across the windshield of the aircraft.

3. The windshield wiper system of claim 1, wherein the controller is configured to:
   send electrical signals to and receive electrical signals from the actuator to control rotation of the output shaft of the actuator;
   send electrical signals to and receive electrical signals from the fluid control unit to control operation of the fluid control unit; and
   receive electrical signals from the user interface indicating an action to be performed by the controller.

4. The windshield wiper system of claim 1, wherein the nozzle is removable from the wiper blade.

5. The windshield wiper system of claim 1, wherein the fluid dispensing from the nozzle is bleed air, water, windshield cleaning fluid, or chemical rain repellant.

6. The windshield wiper system of claim 5, wherein:
   the bleed air is configured to be directed from a gas turbine engine of the aircraft to the nozzle;
   the water is directed from a water reservoir to the nozzle;
   the windshield cleaning fluid is directed from a windshield cleaning fluid reservoir to the nozzle; or
   the chemical rain repellant is directed from a chemical rain repellant reservoir to the nozzle.

7. The windshield wiper system of claim 6, wherein the fluid control unit includes:
   a pump configured to force the fluid to travel from the water reservoir, windshield cleaning fluid reservoir, or the chemical rain repellant reservoir through the fluid line to the nozzle;
   a bleed air valve configured to allow or prevent bleed air from flowing through the fluid line to the nozzle;
   a valve configured to control a flow rate of the fluid travelling from the fluid source and through the fluid line; and
   a heating element configured to increase a temperature of the fluid travelling through the fluid line before the fluid reaches the nozzle.

8. The windshield wiper system of claim 1, wherein the fluid line is routed adjacent the output shaft of the actuator, through a hollow interior of the wiper arm, and to an input port of the nozzle.

9. The windshield wiper system of claim 1, wherein the nozzle includes two sides and at least one output port on each of the two sides, and wherein the nozzle is configured to dispense fluid from the at least one output port on each of the two sides of the nozzle.

10. The windshield wiper system of claim 1, wherein each wiper blade includes a plurality of nozzles coupled to the wiper blade, and wherein each one of the plurality of nozzles is spaced equidistance apart along a length of the wiper blade.

* * * * *